US006902642B2

(12) United States Patent
Kawaharada et al.

(10) Patent No.: US 6,902,642 B2
(45) Date of Patent: Jun. 7, 2005

(54) HYDRAULIC TRANSFER METHOD

(75) Inventors: Yukihiko Kawaharada, Sakura (JP); Akihiro Sawaguchi, Tokyo (JP); Mitsutaka Nanbo, Tokyo (JP); Hiroyuki Tabe, Osaka (JP); Shinji Kato, Sagamihara (JP); Shuzo Mizuno, Tokyo (JP)

(73) Assignees: Dainippon Ink and Chemicals, Inc., Tokyo (JP); Nippon Decor, Inc., Sagamihara (JP)

( * ) Notice: Subject to any disclaimer, the term of this patent is extended or adjusted under 35 U.S.C. 154(b) by 126 days.

(21) Appl. No.: 10/278,884

(22) Filed: Oct. 24, 2002

(65) Prior Publication Data

US 2003/0108675 A1 Jun. 12, 2003

(30) Foreign Application Priority Data

Oct. 30, 2001 (JP) ....................................... 2001-332070
Dec. 19, 2001 (JP) ....................................... 2001-385955

(51) Int. Cl.[7] ............................ B29C 65/00; B05D 7/14

(52) U.S. Cl. ....................... 156/239; 156/240; 156/241; 156/277; 156/285; 427/261; 427/287; 427/109; 427/412.1; 427/434.3; 427/435

(58) Field of Search ............................. 427/434.3, 435, 427/409, 261, 287, 412.1; 156/285, 240, 277, 241, 239

(56) References Cited

U.S. PATENT DOCUMENTS

| | | | | | |
|---|---|---|---|---|---|
| 4,614,683 | A | * | 9/1986 | Barsotti | 428/220 |
| 6,428,647 | B1 | * | 8/2002 | Koh et al. | 156/230 |
| 6,653,394 | B1 | * | 11/2003 | Meisenburg et al. | 524/589 |
| 2002/0192375 | A1 | * | 12/2002 | Sun et al. | 427/255.28 |
| 2002/0192378 | A1 | * | 12/2002 | Hori et al. | 427/256 |

FOREIGN PATENT DOCUMENTS

| | | | | |
|---|---|---|---|---|
| EP | 0 993 874 | A1 | | 4/2000 |
| JP | 58-53480 | | | 3/1983 |
| JP | 61-40200 | A | * | 2/1986 |
| JP | 61-261100 | | | 11/1986 |
| JP | 64-22378 | | | 1/1989 |
| JP | 5-98210 | | | 4/1993 |
| JP | 9-1996 | | | 1/1997 |
| JP | 2001-79456 | | | 3/2001 |
| JP | 2002-293881 | A | * | 10/2002 |

OTHER PUBLICATIONS

JPO computer translation of JP 2002–293881 A, published Oct. 2002.*

European Search Report dated Feb. 20, 2004.

* cited by examiner

*Primary Examiner*—Kirsten C. Jolley
(74) *Attorney, Agent, or Firm*—Armstrong, Kratz, Quintos, Hanson & Brooks, LLP

(57) ABSTRACT

Using a hydraulic transfer film wherein a transfer layer is composed of a decorative layer made of a printing ink coating film or a paint coating film, the transfer layer is hydraulically transferred onto a target body for transfer made of a metal substrate having a cured coating film layer in which a xylene absorption amount is within a range from 3.5 to 100 $g/m^2$. Alternatively, using a hydraulic transfer film wherein a transfer layer has a protective layer made of a radiation-curable resin or a thermosetting resin, the transfer layer is hydraulically transferred onto a target body for transfer made of a metal substrate having a cured coating film layer in which a xylene absorption amount is within a range from 10 to 100 $g/m^2$. Because of good hydraulic transferability and good coating film adhesion between the metal substrate and the transfer layer, it is made possible to produce a metal substrate, which can be stored for a long period and is superior in designed appearance and also has a transfer layer with an arbitrary shape bonded firmly thereto.

7 Claims, No Drawings

HYDRAULIC TRANSFER METHOD

BACKGROUND OF THE INVENTION

1. Field of the Invention

The present invention relates to a hydraulic transfer method which may be used for, for example, automobile parts and household-electric-appliances for which special surface properties and decorativeness are required. More particularly, the present invention relates to a hydraulic transfer method, which comprises transferring a transfer layer to a metal substrate having a cured coating film layer, such as a precoated metal plate, utilizing water pressure.

2. Description of Related Art

Formed articles used in appliances such as refrigerators and washing machines include, for example, formed articles obtained by coating a formed metal by means of spray coating, and formed articles obtained by forming a metal plate which has been coated in advance called a precoated metal (PCM). With the recent diversification of demand regarding design of metal formed articles, not only the shape, but also the color and the pattern are regarded as being of major importance. It is difficult to decorate a metal formed article with a pattern by conventional methods.

A formed article is decorated with a pattern by a method of applying a printed film onto a metal formed article. In the case of a product whose pattern is replaced within a short period, a film is a simple and advantageous means. However, in the case in which the above method is employed in the manufacture of a product used for long periods, such as appliances, there arises a problem in that the resulting product is not satisfactory in view of durability. Depending on the three-dimensional shape of the metal formed article, it is difficult to apply the film to the formed article and there is a problem in that thread holes of the metal formed article must be trimmed.

Similarly, it is also difficult to provide decoration with finely designed appearance to the precoated metal plate. As proposed in Japanese Unexamined Patent Application, First Publication No. 2001-079456, a uniform spotted pattern is provided with difficulty, and fine decorations such as patterns of gravure printing could not be provided.

The hydraulic transfer method is a method of transferring a patterned decorative layer onto a target body for transfer by floating a substrate film made of a water-soluble or water-swellable resin, which has a patterned decorative layer, on the water surface, activating a decorative layer with a solvent while dissolving or swelling the substrate film, and submerging a target body for transfer in water while pushing the target body for transfer against the substrate film, and is an excellent decoration method which may be used on a wide range of the formed articles as the target body for transfer, and design freedom is high. However, because of complicated steps, its application was limited to the manufacture of high-grade products for which finely designed appearance was demanded.

In the hydraulic transfer method, it is necessary that the target body for transfer be firmly attached to the decorative layer. For example, since a decorative layer such as printing ink or coating film transferred onto a metal material such as a galvanized steel plate has poor adhesion to a metal substrate, there arose problems in that a printed pattern collapsed during the hydraulic transfer and a decorative layer peeled off during washing with water or forming after drying.

As a means for solving the problems of the above hydraulic transfer method, Japanese Unexamined Patent Application, First Publication No. Sho 61-261100 proposes a method of producing an in-mold decorated formed article, which comprises hydraulically transferring a printed pattern layer onto a target body for transfer having a curing resin layer, which is dried but is not completely cured and in a semi- or non-cured state, forming a curable resin layer so as to cover the printed pattern layer, and completely curing the curing resin layer which exists on both surfaces of the printed pattern layer.

Although the method proposed in Japanese Unexamined Patent Application, First Publication No. Sho 61-261100 is a method which can be employed in the case in which hydraulic transfer is carried out immediately after applying a curable resin to a metal substrate as the target body for transfer, there was a problem in that it is difficult to keep the metal substrate coated with the curable resin in the semi- or non-cured state while maintaining a clean and smooth coated surface, and curing of the curable resin proceeds during the storage, thus making it impossible to receive a transfer layer to be hydraulically transferred.

Also Japanese Unexamined Patent Application, First Publication No. Hei 1-22378 discloses a method comprising floating a hydraulic transfer plate made of a water-soluble or water-swellable film having a decorative layer made of a resin, which is cured by irradiation with radiation or heat, on the water surface, so that the water-soluble or water-swellable film in the hydraulic transfer plate faces downward, placing a formed body into water from the upper portion, thereby to firmly attach the hydraulic transfer plate to the outer surface of the formed body and to transfer the decorative layer in the hydraulic transfer plate onto the surface of the outer surface of the formed body, removing the water-soluble or water-swellable film in the hydraulic transfer plate, and irradiating the decorative layer with ionizing radiation or heating the decorative layer according to the kind of the composition in the transferred decorative layer, thereby curing the decorative layer.

However, in the method disclosed in Japanese Unexamined Patent Application, First Publication No. Hei 1-22378, there still remains a problem in that the decorative layer is peeled off during washing with water or forming after drying because of poor adhesion between the layer and the metal substrate.

BRIEF SUMMARY OF THE INVENTION

An object to be achieved by the present invention is to provide a metal substrate, which can be kept for a long period and is superior in designed appearance and also has a transfer layer with an arbitrary shape bonded firmly thereon.

The present inventors have intensively researched and have found that if a cured coating film of a precoated metal substrate can sufficiently absorb an organic solvent contained in a hydraulically transferred transfer layer, the transfer layer can be firmly fixed by being bonded to the cured coating film. The present invention was thus completed.

To achieve the above object, the present invention provides (1) a hydraulic transfer method, which comprises hydraulically transferring a hydrophobic transfer layer onto a target body for transfer made of a metal substrate using a hydraulic transfer film comprising a substrate film made of a water-soluble or water-swellable resin and a hydrophobic transfer layer, which can be dissolved in an organic solvent, formed on the substrate film, the hydrophobic transfer layer being composed of a decorative layer made of a printing ink coating film or a paint coating film, wherein the metal substrate is a metal substrate having a cured coating film layer in which a xylene absorption amount is within a range from 3.5 to 100 g/m$^2$.

To achieve the above object, the present invention provides (2) a hydraulic transfer method, which comprises hydraulically transferring a hydrophobic transfer layer onto a target body for transfer made of a metal substrate using a hydraulic transfer film comprising a substrate film made of a water-soluble or water-swellable resin and a hydrophobic transfer layer, which can be dissolved in an organic solvent, formed on the substrate film, the hydrophobic transfer layer having a protective layer made of a radiation-curable resin or a thermosetting resin, wherein the metal substrate is a metal substrate having a cured coating film layer in which a xylene absorption amount is within a range from 10 to 100 g/m$^2$.

According to the hydraulic transfer method of the present invention, it is possible to provide a metal substrate, which can be kept for a long period and is superior in designed appearance and also has a transfer layer with an arbitrary shape bonded firmly thereon because of good hydraulic transferability and good coating film adhesion between the metal substrate and the transfer layer.

DETAILED DESCRIPTION OF THE INVENTION

The target body for transfer used in the present invention is a metal substrate having a cured coating film layer in which a xylene absorption amount is within a range from 3.5 to 100 g/m$^2$. Preferred range of the xylene absorption amount of the cured coating film layer varies depending on the construction of the transfer layer to be hydraulically transferred onto the cured layer. When the transfer layer is composed of only a decorative layer described hereinafter, the xylene absorption amount of the cured coating film layer is within a range from 3.5 to 100 g/m$^2$, preferably from 5 to 80 g/m$^2$, and more preferably from 10 to 60 g/m$^2$. When using a metal substrate having a cured coating film layer wherein the xylene absorption amount of the cured coating film layer is less than 3.5 g/m$^2$, the adhesion of the hydraulically transferred transfer layer to a target body for transfer is not sufficient. On the other hand, when using a metal substrate having a cured coating film layer wherein the xylene absorption amount of the cured coating film layer exceeds 100 g/m$^2$, numerous crater-shaped holes are formed on the surface of the transfer layer transferred hydraulically in the drying step and the commercial value thereof tends to be drastically reduced. Therefore, it is not preferred. In the case in which the transfer layer has a protective layer made of a radiation-curable or thermosetting resin described hereinafter, the xylene absorption amount of the cured coating film is preferably more than that of the transfer layer composed only of the decorative layer and is within a range from 10 to 100 g/m$^2$, preferably from 20 to 80 g/m$^2$, and more preferably from 30 to 60 g/m$^2$.

As used herein, the xylene absorption amount of the cured coating film refers to an amount of xylene absorbed per unit area of a metal substrate at the moment when the amount of xylene absorbed in a cured coating film layer of a metal substrate stabilized after dipping the metal substrate having the cured coating film layer into xylene. More specifically, it refers to an absorption amount of xylene per unit area of the coating film at the moment when the weight of a metal substrate stabilized (usually 96 hours have passed since the beginning of dipping) after repeating the operation of dipping a metal substrate (10 mm×25 mm, or 50 mm×50 mm) having a cured coating film layer in xylene, taking out the metal substrate every 24 hours, wiping off xylene on the surface with a towel and measuring the weight, that is, a solvent absorption amount obtained by dividing a change in weight before and after dipping by a unit area of the metal substrate sample.

The thickness of the cured coating film layer is preferably within a range from 3 to 100 $\mu$m, and particularly preferably from 5 to 80 $\mu$m. When the thickness of the cured coating film layer is controlled to be 3 $\mu$m or more, the adhesion between the metal substrate and the transfer layer becomes sufficient. On the other hand, when the thickness of the cured coating film layer is controlled to 100 $\mu$m or less, the cured coating film layer does not crack when the metal substrate having the cured coating film layer formed thereon is formed into an arbitrary shape.

Regarding the metal substrate having a cured coating film layer, since a transfer layer is hydraulically transferred onto a cured coating film, and furthermore, a protective layer is usually formed on the transfer layer, physical properties of the coating film such as hardness, rubbing resistance, and solvent resistance of the cured coating film layer may be inferior to those of a resin composition which constitutes the coating film layer of a conventional precoated metal plate. Therefore, the cured coating film layer provided on the metal substrate may be a three-dimensional crosslinked cured coating film layer having a low crosslinking degree or a cured coating film layer made of a linear-chain resin which does not substantially have three-dimensional crosslinking, and is preferably made of a material having good adhesion with the transfer layer.

The cured coating film layer provided on the metal substrate is preferably made of a cured article of a resin composition containing a polyester resin and at least one curing agent selected from the group consisting of isocyanate curing agent and amine curing agent. Among these, a cured coating film layer made of a cured resin obtained by reacting a polyester resin having at least one of a hydroxyl group and a carboxyl group at both terminals with diisocyanate is preferred.

The polyester resin can be easily prepared by a method for dehydration condensation of a dicarboxylic acid component and a diol component in accordance with a conventional procedure, or a method for ring-opening polymerization of a cyclic ester of hydroxycarboxylic acid in accordance with a conventional procedure. In addition to the dicarboxylic acid component and the diol component, a small amount of a tri- or polyfunctional polycarboxylic acid and/or polyol can be used as the raw material for the polyester, if necessary.

Examples of the dicarboxylic acid component include phthalic acid, isophthalic acid, terephthalic acid, 2,6-naphthalenedicarboxylic acid, succinic acid, adipic acid, azelaic acid, sebacic acid, dimer acid, tetrahydrophthalic acid, hexahydrophthalic acid, methyl-hexahydrophthalic acid, 1,4-cyclohexanedicarboxylic acid, 1,3-cyclohexanedicarboxylic acid, and anhydrides thereof.

Examples of the diol component include ethylene glycol, propylene glycol, diethylene glycol, dipropylene glycol, 1,3-butanediol, 1,4-butanediol, 1,6-hexanediol, neopentyl glycol, 1,4-cyclohexane dimethanol, 2,2,4-trimethylpentanel, 3-diol, 1,4-cyclohexane dimethanol, aliphatic alkyl oxide adduct such hydrogenated bisphenol A, ethylene oxide adduct of bisphenol A, ethylene oxide adduct of hydrogenated bisphenol A, propylene oxide adduct of hydrogenated bisphenol A or ethylene oxide/propylene oxide adduct of hydrogenated bisphenol A, hydrogenated bisphenol F, ethylene oxide adduct of hydrogenated bisphenol F or ethylene oxide/propylene oxide adduct of hydrogenated bisphenol F, aromatic alkyl oxide adduct such as ethylene oxide adduct of bisphenol A, propylene oxide adduct of bisphenol A, ethylene oxide/propylene oxide adduct of bisphenol A, ethylene oxide adduct of bisphenol F or ethylene oxide/propylene oxide adduct of bisphenol F, polyethylene glycol (PEG), polytetramethylene ether glycol (PTMEG) and polycarbonatediol (PCD).

Examples of the hydroxycarboxylic acid include 2-hydroxyethoxybenzoic acid.

Examples of the cyclic ester of the hydroxycarboxylic acid include ε-caprolactone.

Examples of the tri- or polyfunctional polycarboxylic acid include aromatic polycarboxylic acid such as trimellitic acid or pyromellitic acid, and aliphatic polycarboxylic acid such as butanetetracarboxylic acid.

Examples of the tri- or polyfunctional polyol include aliphatic polyol such as glycerin, trimethylolethane, trimethylolpropane and pentarythritol. When using these tri- or polyfunctional carboxylic acids and/or polyols in combination, the amount is preferably 10 mol % or less based on the entire monomer constituting the polyester resin, which does not cause gelation.

The number-average molecular weight of the polyester resin is preferably within a range from 2000 to 100000, and particularly preferably from 5000 to 15000. By using a polyester having a number-average molecular weight of 2000 or more, sufficient formability can be imparted to the metal substrate having a transfer layer. By using a polyester having a number-average molecular weight of 100000 or less, it becomes easy to handle a paint used to form a cured coating film layer on the metal substrate. The number-average molecular weight is determined by gel permeation chromatography (hereinafter abbreviated merely to GPC) using a calibration curve of a standard polymethacrylic (PMMA) resin.

The glass transition temperature (Tg) of the polyester resin is not specifically limited, but is preferably 30° C. or higher, and particularly preferably 45° C. or higher, in view of performances such as coating film strength and coating film surface in the forming of the metal substrate having the transfer layer.

Examples of a commercially available product of the polyester resin, which can be used in the cured coating film layer, include "BECKOLITE M-6207-40" and "BECKOLITE 57-206-40" manufactured by Dainippon Ink and Chemicals, Inc., and "VYLON 600" and "VYLON 290" manufactured by Toyobo Co., Ltd.

In the case in which the polyester resin is reacted with the curing agent, the curing agent is preferably used in an amount within a range from 5 to 30% by weight relative to 95 to 70% by weight of the polyester resin. When the amount of the curing agent is less than 5% by weight, coating film performances, particularly corrosion resistance is lowered because of low curing degree. On the other hand, when the amount of curing agent exceeds 30% by weight, coating film performances, particularly deep drawability is lowered and the adhesion with the transfer layer is lowered during hydraulic transfer.

Examples of the isocyanate curing agent include aromatic diisocyanates such as xylylene diisocyanate, tolylene diisocyanate and 4,4'-diphenylmethane diisocyanate; aliphatic diisocyanates such as hexamethylene diisocyanate and trimethylhexamethylene diisocyanate; alicyclic diisocyanates such as isophorone diisocyanate; multimers such as isocyanurates of these diisocyanates; and blocked compounds such as adducts of these diisocyanates with polyhydric alcohol.

Examples of the blocking agent include phenol, lactam, alcohol, active methylene, mercaptane, imine, amine, imidazole, oxime and sulfurous acid blocking agents.

In the case in which a polyester resin having at least one of a hydroxyl group and a carboxyl group at both terminals is reacted with diisocyanate to obtain an urethane-modified polyester resin, a reaction ratio of at least one of a hydroxyl group and a carboxyl group of the polyester resin to diisocyanate is selected so that the amount of the isocyanate group is preferably within a range from 0.5 to 5 mol, and particularly preferably from 1.0 to 3.0 mol relative to 1 mol of at least one functional group of the hydroxyl group and the carboxyl group.

In the case in which the curing reaction is carried out using a blocked isocyanate, a dissociation catalyst is preferably used in combination. Examples of the dissociation catalyst include conventional catalysts containing an organotin compound such as dibutyltin dilaurate.

In the reaction between the hydroxyl group or the carboxyl group of the polyester resin between the isocyanate curing agent, an organometallic catalyst can be used to promote the reaction.

Examples of the organometallic catalyst include an organotin compound such as dibutyltin dilaurate, dioctylthin dilaurate, dioctylthin dilacetate or dibutyltin oxide; and organoaluminum compound and organonickel compound. Among these catalysts, an organotin catalyst is preferred.

Examples of a commercially available product of the organotin catalyst include "TAKENATE TK-1" manufactured by Takeda Chemical Industries, Ltd. Examples of a commercially available product of the organoaluminum catalyst and the organonickel catalyst include "K-KAT348" and "XC-4205" manufactured by KING INDUSTRY.

The amount of the organometallic catalyst is preferably within a range from 0.01 to 3.0% by weight, and particularly preferably from 0.05 to 0.3% by weight, based on the total amount of the polyester resin and the isocyanate curing agent.

The amine curing agent includes, for example, a condensate of formaldehyde or paraformaldehyde alkyl-etherified with an alcohol having 1 to 4 carbon atoms with urea, N,N'-ethylene urea, dicyandiamide or aminotriazine, and specific examples thereof include methoxylated methylol urea, methoxylated methylol-N,N'-ethylene urea, methoxylated methylol dicyandiamide, methoxylated methylol melamine, methoxylated methylol benzoguanamine, butoxylated methylol melamine and butoxylated methylol benzoguanamine.

In the reaction between the polyester resin and the amine curing agent, a catalyst can be used to promote the reaction, if necessary. Examples of the catalyst include acids such as hydrochloric acid, phosphoric acid monoalkyl ester and p-toluenesulfonic acid; and salts of these acids and a tertiary amine or a secondary amine compound. The amount of these catalysts is preferably within a range from 0 to 10% by weight based on the amine catalyst.

When using, as the resin constituting the cured coating film layer, a resin comprising a polyester resin and a curing agent, the resin may further contain an epoxy resin or an acrylic resin.

Examples of the epoxy resin include bisphenol A type epoxy resin, novolak type epoxy resin, alicyclic type epoxy resin, alcohol type epoxy resin, polyphenol type epoxy resin and polyglycidylamine type epoxy resin. If necessary, a resin prepared by modifying the epoxy resin with the other resins such as polyester resin may be used.

Examples of a commercially available product of the epoxy resin include "EPICRON 7050-40S" and "EPICRON P-439" manufactured by Dainippon Ink and Chemicals, Inc., and "EPIKOTE 1007" and "EPIKOTE 1009" manufactured by Japan Epoxy Resin Co., Ltd.

The acrylic resin is obtained by polymerizing or copolymerizing one or more monomers selected from the group consisting of acrylic acid, methacrylic acid, alkyl ester having 2 to 18 carbon atoms of acrylic acid or methacrylic acid, and monomer having a reactive functional group such as hydroxyl group, carboxyl group, glycidyl group or isocyanate group at a terminal in accordance with a conventional procedure.

Examples of a commercially available product of the acrylic resin include "LR-635" manufactured by Mitsubishi Rayon Co., Ltd., and "ACRYDIC A-405" manufactured by Dainippon Ink and Chemicals, Inc.

The paint used to form the cured coating film layer may be a clear paint containing no pigment, but may be mixed with a pigment, if necessary.

Examples of the pigment include titanium oxide, strontium chromate, zinc chromate, calcium carbonate, barium sulfate, iron oxide and silicon dioxide.

Into the paint used to form a cured coating film layer, a solvent such as xylene, cyclohexanone, toluene, methyl ethyl ketone, ethyl acetate or Solvesso 100 may also be mixed.

The metal constituting the metal substrate may be any metal which is commonly used for a precoated metal plate. The metal substrate may have any shape such as a plate shape or a cylindrical shape as long as it can be hydraulically transferred, but the metal substrate is preferably subjected to a hydraulic transfer method after forming a coating film layer thereon and forming into an arbitrary shape. Examples of the metal plate include cold rolled steel plate, galvanized steel plate, electrogalvanized steel plate, aluminum-zinc alloy plated steel plate, aluminum plated steel plate, tin plated steel plate, chromium plated steel plate, lead plated steel plate, nickel plated steel plate, aluminum plate, titanium plate and stainless steel plate.

The coating film layer of the metal substrate is formed by directly coating a solution, which is prepared by optionally dissolving the above resin in an organic solvent, on the metal substrate or after subjecting the metal substrate to a conventional coating pre-treatment. The coating pre-treatment may be a conventional pre-treatment of the precoated metal plate and examples thereof include chromate chemical treatment such as electrochromate treatment, coating type chromate treatment or reaction type chromate treatment; phosphate chemical treatment such as zinc phosphate treatment or iron phosphate treatment; and complex oxide film treatment including nickel and cobalt.

Regarding the metal substrate having a cured coating film layer used in the present invention, since a transfer layer is further laminated on the cured coating film, it is not necessary to provide a primer layer between the metal substrate and the cured coating film layer. If necessary, a primer paint may be applied on the metal substrate, and after drying, the cured coating film layer may be applied thereon for the purpose of improving the adhesion between the metal substrate and the cured coating film layer.

The primer paint is not specifically limited and any primer paint such as epoxy resin paint or polyester resin paint can be used without any specific limitation as long as it is commonly used as the primer paint for a precoated metal. In the case in which the corrosion resistance is required, a primer paint containing a rust-proofing pigment such as strontium chromate or zinc chromate is preferably used.

The primer paint is coated using a roll coater or a curtain flow coater used commonly in the manufacture of the precoated metal with a dry thickness of 3 to 100 μm, and preferably 5 to 80 μm, followed by drying and baking. In the case in which the dry thickness is controlled to 10 μm or more, coating, drying and baking may be carried out in several portions to prevent the occurrence of coating film defects such as popping. For example, when the dry thickness is controlled to 60 μm, coating with a dry thickness of 20 μm, drying and baking may be carried out three times.

The baking is preferably carried out under the conditions of an atmospheric temperature of 120 to 400° C., a baking time of 15 to 120 seconds and a plate maximum temperature (hereinafter abbreviated to PMT) of 120 to 280° C. The baking may be carried out by directly heating the coated original plate by an induction heating system.

When the dry thickness is less than 3 μm, the masking properties are lowered and the adhesion of the transfer layer is poor, and thus transfer defects such as collapse of the decorative layer during transferring or peeling of the transferred decorative layer from metal substrate are likely to occur. On the other hand, when the dry thickness is 100 μm or more, coating defects such as popping are likely to occur during the coating and baking, and it becomes difficult to obtain a uniform continuous coating film, and moreover, coating film defects such as cracking of the coating film are likely to occur during the forming.

Although it varies depending upon the kind of the curing agent to be used, when PMT is lower than 120° C., the solvent is likely to remain in the coating film and the crosslinking reaction does not proceed sufficiently, thus making it difficult to obtain a tough coating film. On the other hand, when PMT is higher than 280° C., so-called overbaking occurs, and the color tends to be faded.

In the preparation of the paint by mixing the polyester resin, post-additives such as pigment dispersion stabilizers, gloss modifiers, viscosity modifiers, cissing inhibitors and waxes can be appropriately added, which are generally used in bake type paint, as long as desired physical properties are not impaired. Among the additives used in the preparation of the paint by mixing the polyester resin, a lubricant component such as wax tends to lower the adhesion with the metal substrate having a decorative layer and a cured coating film layer, the amount of the lubricant component such as wax to be added to a resin for forming a coating film of the metal substrate having a cured coating film used in the present invention should be minimized.

The constituent elements of the hydraulic transfer film will now be described in detail in order.

The substrate film made of a water-soluble or water-swellable resin is a substrate film made of a hydrophilic resin which is swellable or soluble in water. As the substrate film made of a water-soluble or water-swellable resin, for example, there can be used films made of polyvinyl alcohol, polyvinyl pyrrolidone, acetylcellulose, polyacrylamide, acetylbutylcellulose, gelatine, glue, sodium alginate, hydroxyethylcellulose and carboxymethylcellulose.

Among these films, a polyvinyl alcohol (PVA) film used as a hydraulic transfer film is particularly preferred because it is easily dissolved in water and is readily available, and is also suited for printing of a decorative layer and formation of a protective layer. The thickness of the substrate film used is preferably within a range from 10 to 200 μm.

It is necessary that the substrate film made of a water-soluble or water-swellable resin have flexibility to exhibit sufficient conformability to the curved surface of the target body for transfer having a three-dimensional structure when the target body is put on the hydraulic transfer film and dipped in water. The substrate film may be swollen without being completely dissolved in water.

The transfer layer will now be described.

The transfer layer provided on the substrate film is classified into the following three kinds:

(1) a transfer layer composed of a decorative layer made of a hydrophobic printing ink coating film or paint coating film, which is soluble in an organic solvent, (2) a transfer layer composed of a protective layer made of a radiation-curable resin or thermosetting resin, or (3) a transfer layer composed of a protective layer made of a radiation-curable resin or thermosetting resin, and a decorative layer made of a hydrophobic printing ink coating film or paint coating film, which is soluble in an organic solvent, provided on the protective layer.

The thickness of the transfer layer is not specifically limited, but is preferably within a range from 1 to 300 μm, and particularly preferably from 10 to 150 μm. When the thickness of the transfer layer is less than 1 μm, it is difficult to form a coating film capable of realizing a sufficient surface protection function or decoration which meets desired designed appearance. On the other hand, when the thickness of the transfer layer exceeds 300 μm, it becomes difficult to uniformly activate the transfer layer during hydraulic transfer.

Here, "activation of the transfer film" means to solubilize the transfer layer without completely dissolving the resin constituting the transfer layer having a decorative layer or a cured resin layer by applying or spreading an organic solvent on the transer layer so as to facilitate peeling of the hydrophobic transfer layer from the hydrophilic substrate film during hydraulic transfer and to improves the conformability and the adhesion of the transfer layer to the three-dimensional curved surface of the body to which it is to be transferred by imparting the flexibility to the transfer layer.

The decorative layer will now be described.

The printing ink or paint used in the decorative layer must be capable of being activated by the organic solvent. In addition, a property capable of maintaining the flexibility so as to prevent the pattern from running is important. A gravure printing ink is particularly preferred.

The resin for varnish used in the printing ink or paint is preferably a thermoplastic resin such as acrylic resin, polyurethane resin, polyamide resin, urea resin, epoxy resin, polyester resin, vinyl resin (vinyl chloride-vinyl acetate copolymer resin), vinylidene resin (vinylidene chloride, vinylidene fluonate), ethylene-vinyl acetate resin, polyolefin resin, chlorinated olefin resin, ethylene-acrylic resin, petroleum resin or cellulose derivative resin. Among these resins, alkyd resin, acrylic resin, polyurethane resin, cellulose derivative resin and ethylenevinyl acetate resin are particularly preferred.

The colorant of the printing ink or paint in the decorative layer is preferably a pigment, and any of an inorganic pigment and an organic pigment can be used. Furthermore, a metallic gloss ink containing a paste of metal cutting particles and a metal strip obtained from a deposited metal film as a pigment can also be used. As the metal, aluminum, gold, silver, brass, titanium, chromium, nickel, nickel chromium and stainless steel can be preferably used. The metal strip may be surface-treated with an epoxy resin, polyurethane, an acrylic resin, or cellulose derivative such as nitrocellulose in order to improve the dispersibility, to prevent oxidation and to enhance the strength of the ink layer.

As long as the designed appearance and spreadability are not impaired, defoamers, sedimentation inhibitors, pigment dispersants, fluidity modifiers, blocking inhibitors, antistatic agents, antioxidants, photostabilizers, ultraviolet absorbers, internal curing agent, and various additives for improving rubbing resistance can also be added in the protective layer and the decorative.

The thickness of the decorative layer is not specifically limited, but is preferably within a range from 0.1 to 10 μm, and particularly preferably from 1 to 7 μm. When the thickness of the decorative layer is less than 0.1 μm, it is difficult to impart satisfactory designed appearance. On the other hand, when the thickness of the decorative layer exceeds 10 μm, the thickness is too large to uniformly activate the transfer layer during hydraulic transfer.

To protect the surface of the metal substrate decorated by hydraulically transferring the decorative layer and to impart satisfactory designed appearance such as gloss and depth impression, a protective layer made of a curable resin is further provided on the decorative sheet formed on the metal substrate, preferably.

The method of providing a protective layer on the decorative sheet formed on the metal substrate includes, for example, a conventionally known method of spray-coating a curable resin composition, which can be cured by irradiation with radiation or heating and provide a transparent cured article, and curing the curable resin composition by radiation with radiation or heating. Also a method of further hydraulically transferring only an uncured protective layer onto the decorative layer can be employed.

By using the hydraulic transfer film composed of a decorative layer made of a printing ink coating film or paint coating film and a protective layer made of a radiation-curable resin or thermosetting resin provided under the decorative layer, the decorative layer and the protective layer made of the curable resin can be transferred onto the cured coating film of the metal substrate by single hydraulic transfer.

The protective layer is made of either a transparent radiation-curable resin or thermosetting resin and is non-tacky even before curing.

Although the transparency of the protective layer varies depending on required characteristics of the decorated target body for transfer, the protective layer may have transparency enough to see a color or pattern of the decorative layer through it and does not require complete transparency, and it may be transparent or semi-transparent. Also the protective layer must be easily peeled off from the hydrophilic substrate film and transferred onto a three-dimensional formed body as the target body for transfer during hydraulic transfer, similar to the decorative layer. Therefore, it is necessary that the resin constituting the protective layer be entirely hydrophobic.

It is markedly effective to improve drying properties of the protective layer to mix a non-curable and non-tacky thermoplastic resin in the protective layer. However, since a large amount of the non-curable thermoplastic resin is likely to inhibit the curing reaction of the curable resin, the non-tacky thermoplastic resin is preferably added in the amount of 70 parts or less based on 100 parts by weight of the resin in the protective layer.

Another required characteristic of the protective layer is that it is activated by the organic solvent spread before being hydraulically transferred, thereby to be sufficiently solubilized or to be made flexible. This solubilization may be any solubilization as long as the transfer layer composed of the protective layer and the decorative layer can become flexible so that the transfer layer is sufficiently conformable to the three-dimensional curved surface of the target body for transfer when the protective layer and the decorative layer, which are permeated with the organic solvent, are transferred as an integral transfer layer onto the target body for transfer from the hydraulic transfer film. When the resin component of the decorative layer and that of the protective layer are excessively solubilized and dissolved by the solubilization to such a degree that both resin components are miscible with each other, disorder of the pattern of the decorative layer and lowering of the gloss occur, and therefore, this is not preferred.

The curable resin constituting the protective layer is roughly classified into radiation-curable resin cured by irradiation with radiation and a thermosetting resin cured by heating. As used herein, the radiation is an ultraviolet light or an electron beam. The radiation-curable resin has two or more curable groups, which are directly cured by radiation or cured by the reaction with initiation species generated by radiation, in a molecule and a radical curable resin or a cation curable resin is preferred.

The resin is a resin having a curable group, which initiates polymerization by means of a radical source or cation source, on a main chain, a side chain or a terminal group. Examples of usable curable group include, but are not limited to, vinyl curable groups such as acryloyl groups, allyl groups, styryl groups, vinyl ester groups, vinyl ether groups, allenyl groups or acetylene groups; and ring-opening curable groups such as maleimide groups, epoxy groups, cyclic carbonate groups, oxetane groups or oxazoline groups.

The radiation-curable resin used in the protective layer is preferably an acrylic resin, and is particularly preferably an acrylate having two or more (meth)acryloyl groups in a molecule. As used herein, the acrylate having a (meth) acryloyl group refers to a resin having either a methacryloyl group or an acryloyl group.

The resin having a (meth)acryloyl group can be used without causing any trouble as long as it is an acrylic resin used generally as a resin for paint. Examples of the resin having a (meth)acryloyl group include urethane (meth) acrylate, polyester (meth)acrylate, polyacryl (meth)acrylate, epoxy (meth)acrylate, polyether (meth)acrylate, silicone (meth)acrylate, polybutadiene (meth)acrylate, amino resin (meth)acrylate and maleimide (meth)acrylate.

These resins having (meth)acryloyl groups can be used alone or in combination. Furthermore, these resins can be used in combination with a thermosetting polymer or oligomer described hereinafter as long as they can be mixed.

Among these resins having a (meth)acryloyl group, urethane (meth)acrylate is preferred. The urethane (meth) acrylate can be obtained by the addition reaction between polyisocyanate, which is obtained by reacting polyol such as triol or tetraol with diisocyanate, and an acrylate having a hydroxyl group.

Examples of the (meth)acrylate having a hydroxyl group include hydroxyalkyl esters having 2 to 8 carbon atoms of acrylic acid or methacrylic acid, such as 2-hydroxyethyl (meth)acrylate, 2-hydroxypropyl (meth)acrylate and 3-hydroxypropyl (meth)acrylate.

In the protective layer containing the radiation-curable resin, if necessary, conventionally known photopolymerization initiators and photosensitizers can be used in combination.

Examples of the photopolymerization initiator include acetophenone compound such as diethoxyacetophenone or 1-hydroxycyclohexyl-phenyl ketone; benzoin compound such as benzoin or benzoin isopropyl ether; acylphosphine oxide compound such as 2,4,6-trimethylbenxzoin diphenylphosphine oxide; benzophenone compound such as benzophenone, o-methyl benzoylbenzoate-4-phenylbenzophenone; thioxanthone compound such as 2,4-dimethylthioxanthone; and aminobenzophenone compound such as 4,4'-diethylaminobenzophenone.

Examples of the photosensitizer include amines such as triethanolamine and ethyl 4-dimethylaminobenzoate.

The photopolymerization initiator is required when using ultraviolet light, but is not required when using an electron beam. The amount of the photopolymerization initiator is preferably within a range from 0.5 to 15% by weight, and particularly preferably from 1 to 8% by weight, based on the radiation-curable resin.

The thermosetting resin used in the protective layer will now be described below.

Similarly to the radiation-curable resin, since the printability and coatability are required for the thermosetting resin, the higher the molecular weight of the resin, the better. Specifically, the weight-average molecular weight is preferably within a range from 1,000 to 100,000, and particularly preferably from 3,000 to 30,000. If the resin has a weight-average molecular weight within the above range and also has a high molecular cohesive property, sufficient drying properties can be obtained during printing or coating.

The thermosetting resin is a compound having two or more functional groups capable of reacting by heat in a molecule or a compound containing a thermosetting compound as a base component and a thermosetting compound which serves as a crosslinking agent. Examples of the functional group capable of reacting by heat include N-methylol group, N-alkoxymethyl group, amino group, hydroxyl group, isocyanate group, carboxyl group, epoxy group and methylol group. In addition, an acid anhydride and a carbon-carbon double bond have thermoreactivity.

The compound, which has a carbon-carbon double bond in a molecule and enables the crosslinking reaction due to chain polymerization, is a curable resin identical to the radiation-curable resin and a thermosetting resin can be prepared by using this curable resin in combination with an initiator which generates a radical source by heat. As the initiator, a conventional radical initiator such as benzoyl peroxide or azobisisobutyronitrile is used.

Examples of the combination of the thermosetting resin and the curing agent include combination of a resin having a hydroxyl group or an amino group and a curing agent block isocyanate, combination of a resin having a hydroxyl group or a carboxyl group and an amine curing agent such as N-methylolated or N-alkoxymethylated melamine or benzoguanamine, combination of a resin having a hydroxyl group or a carboxyl group and an acid anhydride such as phthalic anhydride as the curing agent, combination of a resin having a carboxyl group, a carbon-carbon double bond, a nitrile group or an epoxy group and a phenol resin as the curing agent, and a resin having a carboxyl group or an amino group and a compound having an epoxy group as the curing agent.

However, the curing reaction of these thermosetting resins often proceeds gradually without heating, and when the curing reaction proceeds during the storage, the transfer layer is not sufficiently activated by the active agent to cause transfer defects. Therefore, a cold-setting thermosetting resin is not preferred and a thermosetting resin containing polyol and block isocyanate as the curing agent is preferred.

Examples of the polyol include acryl polyol, poly-p-hydroxystyrene, polyether polyol, polyester polyol, polyvinyl alcohol and polyethylene-vinyl alcohol copolymer. Among these, acryl polyol is particularly preferred.

As the block isocyanate, block isocyanate whose isocyanate group is protected with a block group of an alcohol can be used and examples of the block group include phenol, cresol, aromatic secondary amine, tertiary alcohol, lactam and oxime. Since the block group of an alcohol is liberated in the block isocyanate, the crosslinking reaction is not initiated until the block group is heated to a temperature higher than the liberation temperature.

The thermosetting resin used in the protective layer contains acryl polyol as a base component and block isocyanate as a curing agent, particularly preferably. The weight-average molecular weight of the acryl polyol is preferably within a range from 3,000 to 100,000, and particularly preferably from 10,000 to 70,000.

The protective layer is mainly made of a resin containing at least one of the above radiation-curable resin and thermosetting resin, while the curable resin often has a low molecular weight to improve the curing density, and tackiness remains before curing. Furthermore, the curable resin sometimes diffuses or bleeds into the decorative layer to cause blocking with the non-printed or non-coated surface. Therefore, the non-tacky thermoplastic resin is preferably added in the amount of 70 parts by weight or less based on 100 parts by weight of the resin of the protective layer for the purpose of improving the drying properties and printability.

Since the non-polymerizable and non-tacky thermoplastic resin used in the protective layer of the present invention is used in combination with a resin containing at least one of a radiation-curable resin and a thermosetting resin, it is necessary that the thermoplastic resin can be sufficiently mixed with these curable resins. The thermoplastic resin, which causes white turbidity or two-phase separation during mixing, is not preferred. The non-tacky thermoplastic resin preferably has high Tg because the tackiness is lowered.

Examples of the non-tacky thermoplastic resin include poly(meth)acrylate, polystyrene, polyvinyl chloride, polyvinylidene chloride, polyvinyl acetate and polyester. These resins may be those prepared by copolymerizing two or more kinds of monomers. Among these, those, which have high Tg and are suited to improve the drying properties during printing, are poly(meth)acrylate, polystyrene and vinyl chloride-vinyl acetate copolymer. Among these, poly(meth)acrylate containing polymethyl methacrylate as a main component, which is superior in transparency, solvent resistance and rubbing resistance, is particularly preferred and the weight-average molecular weight is preferably within a range from 30,000 to 300,000, and particularly preferably from 150,000 to 300,000.

The protective layer containing the radiation-curable resin is preferably free from tackiness and a combination of urethane (meth)acrylate and poly(meth)acrylate having Tg of 35° C. or higher as a non-tacky thermoplastic resin is preferred. Furthermore, preferred is a resin wherein the non-tacky thermoplastic resin is preferably poly(meth)acrylate prepared by copolymerizing a monomer composition containing 90% or more of methyl methacrylate, and particularly preferably a resin containing urethane acrylate having three or more (meth)acrylic groups in a molecule and poly(meth)acrylate having a weight-average molecular weight of 30,000 to 300,000.

The layer structure of the hydraulic transfer film of the present invention and the lamination method thereof will now be described.

In the case in which the transfer layer is provided with the protective layer, the thickness of the protective layer after curing is not specifically limited, but is preferably within a range from 3 to 200 μm, and particularly preferably from 5 to 150 μm. When the thickness of the protective layer after curing is less than 3 μm, it is difficult to impart sufficient surface protection characteristics. On the other hand, when the thickness of the protective layer after curing exceeds 200 μm, the thickness is too large to uniformly activate the protective layer during hydraulic transfer. The dry thickness of the decorative layer is preferably within a range from 0.5 to 15 μm, and particularly from 1 to 7 μm.

The decorative layer and the protective layer can be formed by not only single printing or coating, but also printing or coating twice or plural times. For example, multi-layer printing may be carried out using a multicolored printing machine. In the gravure printing, because of low density of the printing ink, the thickness achieved by a single operation is limited and overlap printing using the multicolored printing machine is required. In particular, the protective layer is laminated with a desired thickness by overlap printing plural times because the thickness of 3 μm or more is preferred.

In the case of a coater capable of coating with a large thickness like the case of using a comma coater, a desired thickness can be achieved only by a single coating. In the decorative layer formed by overlap printing, a solid layer and a pattern layer are generally laminated by overlap printing.

In the coating method of the decorative layer and the protective layer of the hydraulic transfer film, for example, a gravure coater, gravure reverse coater, flexo coater, blanket coater, roll coater, knife coater, air knife coater, kiss-touch coater and comma coater can be used. It is also possible to coat by spray coating. However, in the case of printing a pattern, gravure printing, flexo printing, offset printing or silk printing is preferably employed. Although it is necessary to pay attention to the drying temperature, a printing machine or coater having a wide drying temperature range and a long drying oven length is suitable for use because of poor drying properties.

As long as the effects such as designed appearance, spreadability and adhesion of the present invention are not adversely affected, various additives for the purpose of defoaming, inhibition of sedimentation, pigment dispersion, modification of fluidity, inhibition of blocking, antistatic treatment, antioxidation, photostability, ultraviolet light absorption and internal crosslinking may be added in the resin composition constituting the decorative layer and the protective layer.

The method of hydraulically transferring a transfer layer of the hydraulic transfer film onto a cured coating film of a target body for transfer, the target body being composed of a metal substrate having the cured coating film, will now be described. The hydraulic transfer method itself of the present invention is the same as a conventional hydraulic transfer method and the outline thereof is as illustrated below.

(1) A hydraulic transfer film is floated on the water surface in a water bath so that a substrate film made of a water-soluble or water-swellable resin faces downward, thereby dissolving or swelling the substrate film in water.

(2) The transfer layer is activated by applying or spraying an organic solvent on the transfer layer of the hydraulic transfer film. Activation of the transfer layer due to the organic solvent may be carried out before floating the hydraulic transfer film on the water surface.

(3) While pressing a target body for transfer against the transfer layer of the hydraulic transfer film, the target body for transfer and the hydraulic transfer film are gradually dipped in water and the transfer layer is transferred by firmly attaching to the target body for transfer by means of hydraulic pressure.

(4) The target body for transfer taken out from the water bath is dried.

(5) In the case in which the transfer layer includes a protective layer, the protective layer of the transferred transfer layer is cured by irradiation with radiation or heating.

In the case in which the transfer layer of the hydraulic transfer film includes a protective layer, a spray coating step after hydraulic transfer can be omitted. Therefore, the manufacturing time is reduced as compared with a conventional hydraulic transfer method and also, there is an advantage in that it is not necessary to provide a coating booth on the manufacturing floor.

Water in the water tank used in hydraulic transfer not only serves as a hydraulic pressure medium for firmly attaching the hydraulic transfer film, the decorative layer and the protective layer to the target body for transfer when transferring the decorative layer and the protective layer, but also swells or dissolves the substrate film made of the water-soluble or water-swellable resin to impart flexibility sufficient to firmly attach the substrate film to the target body for transfer. Specifically, the water may be water such as tap water, distilled water or deionized water, or water containing 10% or less of inorganic acids such as boric acid or alcohols dissolved therein according to the kind of the substrate film.

It is important that the organic solvent used to activate the transfer layer not be vaporized until the hydraulic transfer step is completed. The organic solvent used in the hydraulic transfer film having a protective layer of the present invention may be the same as that used in a conventional hydraulic transfer method and examples thereof include toluene, xylene, butylcellosolve, butylcarbitol acetate, carbitol, carbitol acetate, cellosolve acetate, methyl isobutyl ketone, ethyl acetate, isobutyl acetate, isobutyl alcohol, isopropyl alcohol, n-butanol, and mixtures thereof.

To enhance the adhesion between the printing ink or paint and the target body for transfer, a small amount of a resin component may be mixed with the organic solvent. For example, the adhesion is sometimes enhanced by mixing 1 to 10% by weight of a resin having a structure similar to the binder of the ink, such as polyurethane, acrylic resin or epoxy resin.

After transferring the transfer layer onto the target body for transfer, the substrate film is dissolved in water or peeled off by washing or by a physical and chemical means. Similar to a conventional hydraulic transfer method, the substrate film is dissolved or peeled off by means of water flow, and preferably by a water jet.

In the step of drying the target body for transfer after hydraulic transfer, in the case in which the transfer layer includes a protective layer made of a thermosetting resin, drying and curing of the protective layer can be carried out. The curing time varies depending upon the composition and the kind of the curing agent, but is preferably selected so that curing proceeds within a range from several minutes to one hour in view of the step.

In the case in which the transfer layer contains a protective layer made of a radiation-curable resin, the protective layer is cured by irradiation with radiation after drying. In this case, the time of the curing step can be reduced by using an ultraviolet light or electron beam irradiation machine capable of proceeding the curing reaction by irradiating with far infrared ray while drying.

Specific examples of the metal substrate having a transfer layer of the present invention include metal sections of appliances such as TV sets, video recorders, radio cassette tape recorders, personal computers, printers, facsimile machines, magneto-optical disk drives, hard disk drives, CD/DVD drives, scanners, tuners for TV set, portable CD players, portable MD players, portable cassette players, portable telephones, refrigerators, air conditioners, gas fan heaters, oil fan heaters, ceramic heaters, air cleaners, domestic lighting equipment, digital cameras, video cameras, washing machines, clothes drying machines, dishwashers, microwave ovens, toaster ovens, electric pots and rice cookers. Also, the metal substrate can be applied to members of steel furniture such as tables, bookshelves, and benches, members of built-in kitchens, and building members such as windows and window frames. Furthermore, the metal substrate having high surface physical properties can be applied to automobile interior panels, automobile exterior plates and aluminum wheels.

EXAMPLES

The present invention will be described in detail by way of Examples. In the following Examples, "percentages" and "parts" are by weight unless otherwise specified. In the following Examples, a metal substrate having a cured coating film layer is abbreviated to a "precoated metal plate".

Preparation Example 1

Preparation of Precoated Metal Plate (X1)

25 mol % of terephthalic acid, 25 mol % of isophthalic acid, 25 mol % of ethylene glycol and 25 mol % of neopentyl glycol were charged in a reaction vessel and the polycondensation reaction was carried out. After the completion of the reaction, the reaction mixture was dissolved in a mixed solvent of cyclohexanone and Solvesso 100 (weight ratio: 50/50) to obtain a polyester resin (P1) having a nonvolatile content of 40%. A number-average molecular weight of the polyester resin (P1) thus obtained was 10,000.

25 Parts of the polyester resin (P1), 5 parts of titanium oxide, 15 parts of a rust-proofing strontium chromate pigment, 5 parts of calcium carbonate and 7 parts of cyclohexanone were mixed and kneaded in a sand mill. After the completion of kneading, 25 parts of the polyester resin (P1), 8 parts of methyl etherified methylolmelamine (SUPER BECKAMINE L-105, manufactured by Dainippon Ink and Chemicals, Inc.) and 10 parts of xylene were added to obtain a paint (Z1).

Then, the paint (Z1) was roll-coated on a chromated galvanized steel plate (thickness: 0.6 mm, zinc coating weight: 60 g/m$^2$) with a dry thickness of 7 $\mu$m in a coil coating line and the coating film was cured by baking in a hot-air drying oven at a plate maximum temperature of 210° C. for 40 seconds to obtain a precoated metal plate (X1).

Preparation Example 2

Preparation of Precoated Metal Plate (X2)

12.5 mol % of terephthalic acid, 12.5 mol % of isophthalic acid, 25 mol % of adipic acid, 25 mol % of ethylene glycol and 25 mol % of neopentyl glycol were charged in a reaction vessel and the polycondensation reaction was carried out. After the completion of the reaction, the reaction mixture was dissolved in a mixed solvent of cyclohexanone and Solvesso 100 (weight ratio: 50/50) to obtain a polyester resin (P2) having a nonvolatile content of 40%. A number-average molecular weight of the polyester resin (P2) thus obtained was 11,000.

In the same manner as in Preparation Example 1, except that the polyester resin (P2) was used in place of the polyester resin (P1) in Preparation Example 1, a precoated metal plate (X2) was obtained.

Preparation Example 3

Preparation of Precoated Metal Plate (X3)

25 mol % of terephthalic acid, 25 mol % of isophthalic acid, 25 mol % of ethylene glycol and 25 mol % of an ethylene oxide (2.3 mol) adduct of bisphenol A were charged in a reaction vessel and the polycondensation reaction was carried out. After the completion of the reaction, the reaction mixture was dissolved in a mixed solvent of cyclohexanone and Solvesso 100 (weight ratio: 50/50) to obtain a polyester resin (P3) having a nonvolatile content of 40%. A number-average molecular weight of the polyester resin (P3) thus obtained was 90,000.

In the same manner as in Preparation Example 1, except that the polyester resin (P3) was used in place of the polyester resin (P1) in Preparation Example 1, a precoated metal plate (X3) was obtained.

Preparation Example 4

Preparation of Precoated Metal Plate (X4)

20 mol % of terephthalic acid, 20 mol % of isophthalic acid, 10 mol % of adipic acid, 16 mol % of ethylene glycol, 16 mol % of neopentyl glycol and 18 mol % of 1,6-hexanediol were charged in a reaction vessel and the polycondensation reaction was carried out. After the completion of the reaction, the reaction mixture was dissolved in a mixed solvent of cyclohexanone, Solvesso 100 and isophorone (weight ratio: 15/75/10) to obtain a polyester resin (P4) having a nonvolatile content of 40%. A number-average molecular weight of the polyester resin (P4) thus obtained was 2,900.

25 Parts of the polyester resin (P4), 25 parts of titanium oxide and 7 parts of isophorone were mixed and kneaded in a sand mill. After the completion of kneading, 25 parts of the polyester resin (P4), 8 parts of methyl etherified methylolmelamine (SUPER BECKAMINE L-105, manufactured by Dainippon Ink and Chemicals, Inc.) and 10 parts of xylene were added to obtain a paint (Z4).

Then, the paint (Z4) was roll-coated on the precoated metal plate (X3) with a dry thickness of 18 μm and the coating film was cured by baking in a hot-air drying oven at a plate maximum temperature of 230° C. for 60 seconds to obtain a precoated metal plate (X4).

Preparation Example 5

Preparation Precoated Metal Plate (X5)

45 Parts calculated in terms of a solid content of "BECKOLITE 57-206-40" (straight-chain polyester resin having a hydroxyl group at a terminal, number-average molecular weight: 10,000) manufactured by Dainippon Ink and Chemicals, Inc., 50 parts of titanium white and 20 parts of a mixed solvent of cyclohexanone, isophorone and xylol in a mixing ratio of 30/50/20 were mixed and milled in a bead mill. After the completion of milling, 5 parts of xylene diisocyanate (XDI) and 0.5 parts of dibutyltin dilaurate (TK-1) as the curing agent were added to obtain a paint (Z5).

The paint (Z5) was coated on a chromated galvanized steel plate (coating weight: 60 g/m$^2$) coated with the paint (Z1) (5 μm) prepared in Preparation Example 1 with a dry thickness of 40 μm using a bar coater and the coating film was cured by baking in a hot-air drying oven at a plate maximum temperature of 235° C. for 60 seconds to obtain a precoated metal plate (X5).

Preparation Example 6

Preparation of Precoated Metal Plate (X6)

In the same manner as in Preparation Example 5, except that 5 parts of hexamethylene diisocyanate (HDI) and 0.5 parts of dibutyltin dilaurate were used in place of 5 parts of xylene diisocyanate (XDI) and 0.5 parts of dibutyltin dilaurate (TK-1) in Preparation Example 5, a precoated metal plate (X6) was obtained.

Preparation Example 7

Preparation of Precoated Metal Plate (X7)

22.5 Parts calculated in terms of a solid content of "BECKOLITE 57-206-40" manufactured by Dainippon Ink and Chemicals, Inc., 22.5 parts calculated in terms of a solid content of "BECKOLITE M6207-40" (straight-chain polyester resin having a hydroxyl group at a terminal, number-average molecular weight: 10,000) manufactured by Dainippon Ink and Chemicals, Inc., 50 parts of titanium white and 20 parts of a mixed solvent of cyclohexanone, isophorone and xylol in a mixing ratio of 30/50/20 were mixed and milled in a bead mill. After the completion of milling, 5 parts of xylene diisocyanate and 0.5 parts of dibutyltin dilaurate as the curing agent were added to obtain a paint (Z7).

In the same manner as in Preparation Example 5, except that the paint (Z7) was used in place of the paint (Z5) in Preparation Example 5, a precoated metal plate (X7) was obtained.

Preparation Example 8

Preparation of Precoated Metal Plate (X8)

45 Parts calculated in terms of a solid content of "BECKOLITE M6207-40" manufactured by Dainippon Ink and Chemicals, Inc., 50 parts of titanium white and 20 parts of a mixed solvent of cyclohexanone, isophorone and xylol in a mixing ratio of 30/50/20 were mixed and milled in a bead mill. After the completion of milling, 5 parts of xylene diisocyanate and 0.5 parts of dibutyltin dilaurate as the curing agent were added to obtain a paint (Z8).

In the same manner as in Preparation Example 5, except that the paint (Z8) was used in place of the paint (Z5) in Preparation Example 5, a precoated metal plate (X8) was obtained.

Preparation Example 9

Preparation of Precoated Metal Plate (X9)

45 Parts calculated in terms of a solid content of "BECKOLITE 57-206-40" (straight-chain polyester resin having a hydroxyl group at a terminal, number-average molecular weight: 10,000) manufactured by Dainippon Ink and Chemicals, Inc., 50 parts of titanium white and 20 parts of a mixed solvent of cyclohexanone, isophorone and xylol in a mixing ratio of 30/50/20 were mixed and milled in a bead mill. After the completion of milling, 5 parts of xylene diisocyanate (XDI) and 0.5 parts of dibutyltin dilaurate (TK-1) as the curing agent were added to obtain a paint (Z9).

Then, the paint (Z9) was coated on a chromated galvanized steel plate (coating weight: 60 $g/m^2$) with a dry thickness of 8 $\mu$m using a bar coater and the coating film was cured by baking in a hot-air drying oven at a plate maximum temperature of 235° C. to obtain a precoated metal plate (X9).

Preparation Example 10

Preparation of Precoated Metal Plate (X10)

15 mol % of terephthalic acid, 10 mol % of isophthalic acid, 25 mol % of adipic acid, 25 mol % of ethylene glycol and 25 mol % of neopentyl glycol were charged in a reaction vessel and the polycondensation reaction was carried out. After the completion of the reaction, the reaction mixture was dissolved in a mixed solvent of cyclohexanone and Solvesso 100 (weight ratio: 50/50) to obtain a polyester resin (P10) having a nonvolatile content of 40%. A number-average molecular weight of the polyester resin (P10) thus obtained was 13,000.

25 Parts of the polyester resin (P10), 25 parts of titanium oxide and 7 parts of isophorone were mixed and kneaded in a sand mill. After the completion of kneading, 25 parts of the polyester resin (P10), 8 parts of methyl etherified methylolmelamine (SUPER BECKAMINE L-105, manufactured by Dainippon Ink and Chemicals, Inc.) and 10 parts of xylene were added to obtain a paint (Z10).

Then, the paint (Z10) was roll-coated on a chromated galvanized steel plate (coating weight: 60 $g/m^2$) coated with the paint (Z1) prepared in Preparation Example 1 (3 $\mu$m) with a dry thickness of 3 $\mu$m in a coil coating line and the coating film was cured by baking in a hot-air drying oven at a plate maximum temperature of 230° C. for 60 seconds to obtain a precoated metal plate (X10).

Preparation Example 11

Preparation of Precoated Metal Plate (X11)

25 mol % of terephthalic acid, 10 mol % of isophthalic acid, 15 mol % of adipic acid, and 25 mol % of polyhexamethylene carbonate (molecular weight: 2,000) and 25 mol % of 1,5-pentanediol as the aliphatic polycarbonate diol were charged in a reaction vessel and the polycondensation reaction was carried out. After the completion of the reaction, the reaction mixture was dissolved in a mixed solvent of cyclohexanone, Solvesso 100 and isophorone (weight ratio: 15/75/10) to obtain a polyester resin (P11) having a nonvolatile content of 30%. A number-average molecular weight of the polyester resin (P11) thus obtained was 16,000. In the same manner as in Example 5, except that 45 parts calculated in terms of a solid content of the polyester resin (P11) was used in place of "BECKOLITE 57-206-40" and 5 parts of hexamethylene diisocyanate (HDI) and 0.5 parts of dibutyltin dilaurate were used in place of xylene diisocyanate (XDI) and dibutyltin dilaurate (TK-1) in Preparation Example 5, a precoated metal plate (X11) was obtained.

Preparation Example 12

Preparation of Precoated Metal Plate (X12)

25 mol % of terephthalic acid, 10 mol % of isophthalic acid, 15 mol % of adipic acid, 25 mol % of ethylene glycol and 25 mol % of neopentyl glycol were charged in a reaction vessel and the polycondensation reaction was carried out. After the completion of the reaction, the reaction mixture was dissolved in a mixed solvent of cyclohexanone and Solvesso 100 (weight ratio: 50/50) to obtain a polyester resin (P12) having a nonvolatile content of 40%. A number-average molecular weight of the polyester resin (P12) thus obtained was 14,000.

25 Parts of the polyester resin (P12), 25 parts of titanium oxide and 7 parts of isophorone were mixed and kneaded in a sand mill. After the completion of kneading, 25 parts of the polyester resin (P12), 8 parts of methyl etherified methylolmelamine (SUPER BECKAMINE L-105, manufactured by Dainippon Ink and Chemicals, Inc.) and 10 parts of xylene were added to obtain a paint (Z12).

The paint (Z1) prepared in Preparation Example 1 was coated on a chromated galvanized steel plate (coating weight: 60 $g/m^2$) with a dry thickness of 3 $\mu$m and dried to obtain a chromated galvanized steel plate having a primer layer.

Then, the paint (Z12) was roll-coated on the chromated galvanized steel plate (coating weight: 60 $g/m^2$) having a primer layer with a dry thickness of 4 $\mu$m and the coating film was cured by baking in a hot-air drying oven at a plate maximum temperature of 230° C. for 60 seconds to obtain a precoated metal plate (X12).

Preparation Example 13

Preparation of Precoated Metal Plate (X13)

45 Parts calculated in terms of a solid content of "BECKOLITE 57-206-40" (straight-chain polyester resin having a hydroxyl group at a terminal, number-average molecular weight: 10,000) manufactured by Dainippon Ink and Chemicals, Inc., 50 parts of titanium white and 20 parts of a mixed solvent of cyclohexanone, isophorone and xylol in a mixing ratio of 30/50/20 were mixed and milled in a bead mill. After the completion of milling, 5 parts of xylene diisocyanate (XDI) and 0.5 parts of dibutyltin dilaurate (TK-1) as the curing agent were added to obtain a paint (Z13).

The paint (Z13) was coated on a chromated galvanized steel plate (coating weight: 60 $g/m^2$) with a dry thickness of 20 $\mu$m using a bar coater and the coating film was cured by baking at a plate maximum temperature of 235° C. The above coating and baking operation was repeated four times to obtain a precoated metal plate (X13) having a total thickness of 80 $\mu$m.

Preparation Example 14

Preparation of Ultraviolet-Curable Resin Composition (H1)

40 Parts of a trifunctional urethane acrylate prepared by esterifying one molecule of polyisocyanate, which is obtained by reacting three molecules of tolylene diisocyanate with one molecule trimethylolpropane, with three molecules of hydroxyethyl methacrylate and 60 parts of polymethyl methacrylate having a weight-average molecular weight of 200,000 as the non-tacky thermoplastic resin were dissolved in a mixed solvent of ethyl acetate and methyl ethyl ketone in a mixing ratio of 1/1 to obtain an ultraviolet-curable resin composition (H1) having a solid content of 30%.

Preparation Example 15

Preparation of Thermosetting Resin Composition (H2)

85 Parts of acryl polyol (weight-average molecular weight: 25,000) prepared by copolymerizing hydroxyethyl methacrylate, methyl methacrylate, ethyl acrylate, butyl acrylate and styrene in a molar ratio of 20/30/15/15/20 and 19 parts of a mixture of a xylylene diisocyanate phenol adduct having almost the same isocyanate value as a hydroxyl value of the acryl polyol and a phenol adduct of a trimer of xylylene diisocyanate were dissolved in a mixed solvent of toluene and ethyl acetate in a mixing ratio of 1/1 to obtain a thermosetting resin composition (H2) having a solid content of 25%.

Preparation Example 16

Preparation of Hydraulic Transfer Film (F1)

On the surface of a film having a thickness of 35 μm made of polyvinyl alcohol, pattern printing and solid printing were carried out in three printing plates with a thickness of 4 g (solid content)/$m^2$ by a gravure printing technique using the following printing ink A.

Composition of Printing Ink A; Black, Brown or White

A printing ink was prepared from 20 parts of polyurethane ("BURNOCK EZL676", manufactured by Dainippon Ink and Chemicals, Inc.), 10 parts of a pigment (black, brown or white), 30 parts of ethyl acetate, 30 parts of toluene, 8 parts of a dispersion of a polyethylene wax in ink varnish and 2 parts of a silica powder in accordance with a conventional procedure.

Preparation Example 17

Preparation of Hydraulic Transfer Film (F2)

An ultraviolet-curable resin composition (H3) comprising 99 parts of the ultraviolet-curable resin composition (H1) and 1 part of "IRGACURE 184" (photopolymerization initiator, manufactured by Ciba Specialty Chemicals Inc.) was prepared.

On the surface of a film having a thickness of 35 μm made of polyvinyl alcohol, solid printing was carried out in four printing plates with a thickness of 10 g (solid content)/$M^2$ by a gravure printing technique using an ultraviolet-curable resin composition (H3).

Preparation Example 18

Preparation of Hydraulic Transfer Film (F3)

On the surface of a film having a thickness of 35 μm made of polyvinyl alcohol, solid printing was carried out in four printing plates with a thickness of 10 g (solid content) /$m^2$ by a gravure printing technique using an ultraviolet-curable resin composition (H3). Furthermore, pattern printing and solid printing were carried out in three printing plates with a thickness of 4 g (solid content)/$m^2$ using a printing ink with the following formulation.

Composition of Printing Ink; Red or Blue

A printing ink was prepared from 20 parts of polyurethane ("polyurethane 2569", manufactured by Arakawa Chemical Industries, Ltd.), 10 parts of a pigment (red or blue), 30 parts of ethyl acetate, 30 parts of toluene, 8 parts of a dispersion of a polyethylene wax in ink varnish and 2 parts of a silica powder in accordance with a conventional procedure.

Preparation Example 19

Preparation of Hydraulic Transfer Film (F4)

A curable resin composition (H4) comprising 49.5 parts of the ultraviolet-curable resin composition (H1), 0.5 parts of "IRGACURE 184" and 50 parts of the thermosetting resin composition (H2) was prepared.

On the surface of a film having a thickness of 35 μm made of polyvinyl alcohol, solid printing was carried out in four printing plates with a thickness of 10 g (solid content)/$m^2$ by a gravure printing technique using a thermosetting resin composition (H4). Furthermore, pattern printing and solid printing were carried out in three printing plates with a thickness of 4 g (solid content)/$m^2$ using a printing ink with the following formulation.

Composition of Printing Ink; Red or Blue

A printing ink was prepared from 20 parts of polyurethane ("polyurethane 2569", manufactured by Arakawa Chemical Industries, Ltd.), 10 parts of a pigment (red or blue), 30 parts of ethyl acetate, 30 parts of toluene, 8 parts of a dispersion of a polyethylene wax in ink varnish and 2 parts of a silica powder in accordance with a conventional procedure.

Example 1

Hydraulic Transfer onto Precoated Metal Plate (X1)

The hydraulic transfer film (F1) was floated on the water surface in a water bath at 30° C. so that the printed surface faces upward, and after standing for 2 minutes, an active agent (main component: methyl isobutyl ketone) was spread over the film with a weight of 20 g/$m^2$. After standing for additional 10 seconds, a formed article (a housing for an oil fan heater) using the precoated metal plate (X1) was pressed from a vertical direction, thereby transfering a decorative layer composed of the printed surface. After the completion of transfer, the transferred material was washed with water and dried at 90° C. for 15 minutes to obtain a metal substrate having a decorative layer on the surface.

Example 2

Hydraulic Transfer onto Precoated Metal Plate (X2)

In the same manner as in Example 1, except that the precoated metal plate (X2) was used in place of the precoated metal plate (X1) in Example 1, a metal substrate having a decorative layer on the surface was obtained.

Example 3

Hydraulic Transfer onto Precoated Metal Plate (X3)

In the same manner as in Example 1, except that the precoated metal plate (X3) was used in place of the precoated metal plate (X1) in Example 1, a metal substrate having a decorative layer on the surface was obtained.

Example 4

Hydraulic Transfer onto Precoated Metal Plate (X4)

In the same manner as in Example 1, except that the precoated metal plate (X4) was used in place of the precoated metal plate (X1) in Example 1, a metal substrate having a decorative layer on the surface was obtained.

Example 5

Hydraulic Transfer onto Precoated Metal Plate (X12)

In the same manner as in Example 1, except that the precoated metal plate (X12) was used in place of the precoated metal plate (X1) in Example 1, a metal substrate having a decorative layer on the surface was obtained.

Example 6

Hydraulic Transfer onto Precoated Metal Plate (X5)

The hydraulic transfer film (F1) was floated on the water surface in a water bath at 30° C. so that the printed surface faces upward, and after standing for 2 minutes, an active agent (main component: methyl isobutyl ketone) was spread over the film with a weight of 30 $g/m^2$. After standing for additional 10 seconds, a formed article (a housing for an oil fan heater) using the precoated metal plate (X5) was pressed from a vertical direction, thereby transfering a decorative layer. After the completion of transfer, the transferred material was washed with water and dried at 90° C. for 15 minutes to obtain a metal substrate having a decorative layer.

Example 7

Hydraulic Transfer onto Precoated Metal Plate (X6)

In the same manner as in Example 6, except that the precoated metal plate (X6) was used in place of the precoated metal plate (X5) in Example 6, a metal substrate having a decorative layer was obtained.

Example 8

Hydraulic Transfer onto Precoated Metal Plate (X7)

In the same manner as in Example 6, except that the precoated metal plate (X7) was used in place of the precoated metal plate (X5) in Example 6, a metal substrate having a decorative layer was obtained.

Example 9

Hydraulic Transfer onto Precoated Metal Plate (X8)

In the same manner as in Example 6, except that the precoated metal plate (X8) was used in place of the precoated metal plate (X5) in Example 6, a metal substrate having a decorative layer was obtained.

Comparative Example 1

Hydraulic Transfer of Hydraulic Transfer Film (F1) onto Untreated Steel Plate

In the same manner as in Example 6, except that a formed article (automobile interior parts) using a chromated galvanized steel plate (thickness: 0.6 mm, zinc coating weight: 60 $g/m^2$) was used in place of the formed article (a housing for an oil fan heater) using the precoated metal plate (X5) in Example 6, a metal substrate having a decorative layer was obtained.

Comparative Example 2

Hydraulic Transfer onto Precoated Metal Plate (X10)

In the same manner as in Example 6, except that a formed article (automobile interior parts) using a precoated metal plate (X10) was used in place of the formed article (a housing for an oil fan heater) using the precoated metal plate (X5) in Example 6, a metal substrate having a decorative layer was obtained.

Example 10

Hydraulic Transfer onto Precoated Metal Plate (X1)

The hydraulic transfer film (F2) was floated on the water surface in a water bath at 30° C. so that the printed surface faces upward, and after standing for 2 minutes, an active agent (main component: methyl isobutyl ketone) was spread over the film with a weight of 30 $g/m^2$. After standing for additional 10 seconds, a formed article (a housing for an oil fan heater) using the precoated metal plate (X1) was pressed from a vertical direction, thereby transfering a transfer layer composed of an uncured protective layer. After the completion of transfer, the transferred material was washed with water and dried at 90° C. for 15 minutes. The protective layer was cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer.

Example 11

Hydraulic Transfer onto Precoated Metal Plate (X3)

In the same manner as in Example 10, except that the precoated metal plate (X3) was used in place of the precoated metal plate (X1) in Example 10, a metal substrate having a glossy protective layer was obtained.

Example 12

Hydraulic Transfer onto Precoated Metal Plate (X4)

In the same manner as in Example 10, except that the precoated metal plate (X4) was used in place of the precoated metal plate (X1) in Example 10, a metal substrate having a glossy protective layer was obtained.

Comparative Example 3

Hydraulic Transfer of Hydraulic Transfer Film (F2) onto Untreated Steel Plate

In the same manner as in Example 10, except that a formed article (automobile interior parts) using a chromated galvanized steel plate (thickness: 0.6 mm, zinc coating weight: 60 $g/m^2$) was used in place of the formed article (a housing for an oil fan heater) using the precoated metal plate (X1) in Example 10, a metal substrate having a glossy protective layer was obtained.

Comparative Example 4

Hydraulic Transfer onto Precoated Metal Plate (X9)

In the same manner as in Example 10, except that the precoated metal plate (X9) was used in place of the precoated metal plate (X1) in Example 10, a metal substrate having a glossy protective layer was obtained.

Example 13

Hydraulic Transfer onto Precoated Metal Plate (X5)

The hydraulic transfer film (F2) was floated on the water surface in a water bath at 30° C. so that the printed surface faces upward, and after standing for 2 minutes, an active agent (main component: methyl isobutyl ketone) was spread over the film with a weight of 50 $g/m^2$. After standing for additional 10 seconds, a formed article (a housing for an oil fan heater) using the precoated metal plate (X5) was pressed from a vertical direction, thereby transfering a transfer layer composed of an uncured protective layer. After the completion of transfer, the transferred material was washed with water and dried at 90° C. for 15 minutes. The protective layer was completely cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer.

Example 14

Hydraulic Transfer onto Precoated Metal Plate (X7)

In the same manner as in Example 13, except that the precoated metal plate (X7) was used in place of the precoated metal plate (X5) in Example 13, a metal substrate having a glossy protective layer and a decorative layer was obtained.

Example 15

Hydraulic Transfer onto Precoated Metal Plate (X8)

In the same manner as in Example 13, except that the precoated metal plate (X8) was used in place of the precoated metal plate (X5) in Example 13, a metal substrate having a glossy protective layer and a decorative layer was obtained.

Example 16

Hydraulic Transfer onto Precoated Metal Plate (X2)

The hydraulic transfer film (F3) was floated on the water surface in a water bath at 30° C. so that the printed surface faces upward, and after standing for 2 minutes, an active agent (main component: methyl isobutyl ketone) was spread over the film with a weight of 30 $g/m^2$. After standing for additional 10 seconds, a formed article (a housing for an oil fan heater) using the precoated metal plate (X2) was pressed from a vertical direction, thereby transfering a transfer layer composed of a decorative layer and an uncured protective layer. After the completion of transfer, the transferred material was washed with water and dried at 80° C. for 30 minutes. The protective layer was cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer and a decorative layer.

Comparative Example 5

Hydraulic Transfer of Hydraulic Transfer Film (F3) onto Untreated Steel Plate

In the same manner as in Example 16, except that a chromated galvanized steel plate (thickness: 0.6 mm, zinc coating weight: 60 $g/m^2$) was used in place of the precoated metal plate (X2) in Example 16, a metal substrate having a glossy protective layer and a decorative layer was obtained.

Comparative Example 6

Hydraulic Transfer onto Precoated Metal Plate (X9)

In the same manner as in Example 16, except that the precoated metal plate (X9) was used in place of the precoated metal plate (X2) and the metal substrate having a transfer layer composed of a decorative layer and an uncured protective layer was traveled through an UV irradiation apparatus three times in Example 16, a metal substrate having a glossy protective layer and a decorative layer was obtained.

Example 17

Hydraulic Transfer onto Precoated Metal Plate (X6)

The hydraulic transfer film (F3) was floated on the water surface in a water bath at 30° C. so that the printed surface faces upward, and after standing for 2 minutes, an active agent (main component: methyl isobutyl ketone) was spread over the film with a weight of 50 $g/m^2$. After standing for additional 10 seconds, a formed article (a housing for an oil fan heater) using the precoated metal plate (X6) was pressed from a vertical direction, thereby transfering a transfer layer composed of a decorative layer and an uncured protective layer. After the completion of transfer, the transferred material was washed with water and dried at 80° C. for 30 minutes. The protective layer was cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer and a decorative layer.

Example 18

Hydraulic Transfer onto Precoated Metal Plate (X13)

The hydraulic transfer film (F3) was floated on the water surface in a water bath at 30° C. so that the printed surface faces upward, and after standing for 2 minutes, an active agent (main component: methyl isobutyl ketone) was spread over the film with a weight of 33 $g/m^2$. After standing for additional 10 seconds, a formed article (a housing for an oil fan heater) using the precoated metal plate (X13) was pressed from a vertical direction, thereby transfering a transfer layer composed of a decorative layer and an uncured protective layer. After the completion of transfer, the transferred material was washed with water, dried at 90° C. for 10 minutes, and then dried at 120° C. for 30 minutes. The protective layer was cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer and a decorative layer.

Example 19

Hydraulic Transfer onto Precoated Metal Plate (X3)

The hydraulic transfer film (F4) was floated on the water surface in a water bath at 30° C. so that the printed surface faces upward, and after standing for 2 minutes, an active agent (main component: methyl isobutyl ketone) was spread over the film with a weight of 30 $g/m^2$. After standing for additional 10 seconds, a formed article (a housing for an oil fan heater) using the precoated metal plate (X3) was pressed from a vertical direction, thereby transfering a transfer layer composed of a decorative layer and an uncured protective layer. After the completion of transfer, the transferred material was washed with water, dried at 90° C. for 10 minutes, and then dried at 120° C. for 30 minutes. The protective layer was cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer and a decorative layer.

Example 20

Hydraulic Transfer onto Precoated Metal Plate (X11)

In the same manner as in Example 19, except that the precoated metal plate (X11) was used in place of the precoated metal plate (X3) in Example 19, a metal substrate having a glossy protective layer and a decorative layer was obtained.

Comparative Example 7

Hydraulic Transfer of Hydraulic Transfer Film (F4) onto Untreated Steel Plate

In the same manner as in Example 19, except that a formed article (automobile interior parts) using a chromated galvanized steel plate (thickness: 0.6 mm, zinc coating weight: 60 g/$m^2$) was used in place of the formed article (a housing for an oil fan heater) using the precoated metal plate (X3) in Example 19, a metal substrate having a glossy protective layer was obtained.

Comparative Example 8

Hydraulic Transfer onto Precoated Metal Plate (X9)

In the same manner as in Example 19, except that the precoated metal plate (X9) was used in place of the precoated metal plate (X3) in Example 19, a metal substrate having a glossy protective layer and a decorative layer was obtained.

Example 21

Hydraulic Transfer onto Precoated Metal Plate (X7)

The hydraulic transfer film (F4) was floated on the water surface in a water bath at 30° C. so that the printed surface faces upward, and after standing for 2 minutes, an active agent (main component: methyl isobutyl ketone) was spread over the film with a weight of 50 g/$m^2$. After standing for additional 10 seconds, a formed article (a housing for an oil fan heater) using the precoated metal plate (X7) was pressed from a vertical direction, thereby transfering a transfer layer composed of a decorative layer and an uncured protective layer. After the completion of transfer, the transferred material was washed with water, dried at 90° C. for 10 minutes, and then dried at 120° C. for 30 minutes. The protective layer was cured by traveling a metal substrate, onto which the transfer layer composed of the uncured protective layer was transferred, through an ultraviolet light irradiation apparatus (output: 80 kW/m, conveyor speed: 10 m/min) once to obtain a metal substrate having a glossy protective layer and a decorative layer.

(Evaluation of Deep Drawability)

Each of the precoated metal plates (flat plates) made in the respective Preparation Examples was drawn at a draw ratio of 2.5 using a cupping tester. The resulting product was dipped in boiling water for one hour and the coated condition was visually evaluated according to the following three-rank criteria.

○: no fracture of coating film was observed

Δ: fine cracks were observed

X: fracture of coating film was observed (Measurement of Xylene Absorption Amount)

Five small rectangular pieces of a size of 10 mm×25 mm (sample shape A, weight: about 1 g) and five small square pieces of a size of 50 mm×50 mm (sample shape B, weight: about 9 g) were cut from each of the precoated metal plates (flat plates) produced in the respective Preparation Examples. Each of these five small pieces was accurately weighed (sensitivity of balance used: 0.001 g) and then dipped in xylene in a sealed test tube or a sealable glass container (thin-layer developing chamber). Each sample was taken out every 24 hours and the solvent on the surface of the sample as wiped off with a towel, and then the sample was weighed in a weighing bottle whose weight was previously measured.

This operation was repeated and an absorption amount (g) of the solvent per unit area ($m^2$) was determined by dividing an average of changes in weight of five small pieces by an area at the time when a difference between the measured value of the small pieces and the previous value measured became ±0.002 g or less and a change in weight of all five small pieces became ±0.004 g or less on average (usually 96 hours had passed since the beginning of dipping). In the case in which a change in weight of all five small pieces is ±0.002 g or less before and after dipping in xylene even after 96 hours had passed since the beginning of dipping, we judged that that it exceeds the determination limit (ND: non-detection) and the measurement was stopped. The determination limit of the xylene absorption amount was 8 g/m when using the sample shape A, while it was 0.8 g/$m^2$ when using the sample shape B.

(Evaluation of Hydraulic Transferability)

With respect to each of the metal substrates provided with a transfer layer made in the respective Examples and Comparative Examples, the reproducibility of a pattern of a decorative layer on a three-dimensional formed article was visually observed and evaluated according to the following three-rank criteria.

○: Pattern reproduction area ratio of 98% or more (good transferability)

Δ: Pattern reproduction area ratio of 80% to 98% (slightly good transferability)

X: Pattern reproduction area ratio of less than 80% (poor transferability)

(Evaluation of Coating Film Adhesion)

With respect to each of the metal plates having a transfer layer made in the same manner as in the respective Examples and Comparative Examples, except that a precoated metal plate in the form of a flat plate was used, the coating film adhesion was evaluated (on the basis of 10 points) in accordance with a cross-cut adhesive tape method (JIS K5400).

(Evaluation of Scratch Resistance)

With respect to each of the metal plates having a transfer layer made in the same manner as in the respective Examples and Comparative Examples, except that a precoated metal plate in the form of a flat plate was used, a coating film strength was measured by using a "pencil scratch tester for coating film" defined in JIS-K5401. The length of the core was 3 mm, the angle to the coated surface was 45 degrees, the load was 1 kg, the scratch speed was 0.5 mm/min, the scratch length was 3 mm, and the pencil used was a pencil which is commercially available under the trade name of Mitsubishi Uni.

(Evaluation of Surface Gloss)

With respect to each of the metal plates having a protective layer made in the same manner as in the respective Examples, except that a precoated metal plate in the form of a flat plate was used, a 60-degree mirror surface gloss (JIS K5400) was measured.

(Evaluation of Rubbing Resistance)

With respect to each of the metal plates having a protective layer made in the same manner as in the respective Examples, except that a precoated metal plate in the form of a flat plate was used, surface gloss retention after dry rubbing 100 times was evaluated by a rubbing tester (load: 800 g).

(Evaluation of Detergent Resistance)

With respect to each of the metal plates having a protective layer made in the same manner as in the respective Examples, except that a precoated metal plate in the form of a flat plate was used, a rubbing test (load: 800 g, 100 times back and forth) using an absorbent cotton impregnated with an undiluted solution of "MAGICLEAN" (household detergent, manufactured by Kao Corporation, and the surface gloss retention after the test was measured.

(Evaluation of Adhesion After Hot Water Treatment)

Each of metal plates having a protective layer made in the same manner as in the respective Examples, except that a precoated metal plate in the form of a flat plate was used, was treated in hot water (temperature: 98° C.) for 30 minutes and then the coating film was cut by means of a cutter so that it reached the base to form 100 cross-cuts of 1 mm×1 mm. An adhesive tape was stuck on the coated surface and quickly peeled, and then the peeled condition of the coating film was visually observed and evaluated according to the following three-rank criteria.

○: no peeling was observed

Δ: peeling of 1 to 30% of the entire coating film was observed

X: peeling of 31 to 100% of the entire coating film was observed

In Comparative Example 1 to 8, although hydraulic transfer could be carried out, the resulting metal plates having a transfer layer exhibited drastically poor adhesion between the transfer layer and the metal plate and the evaluation items other than hydraulic transferability and coating film adhesion could not be carried out.

TABLE 1

| | | Example 1 | Example 2 | Example 3 | Example 4 | Example 5 | Example 6 |
|---|---|---|---|---|---|---|---|
| Hydraulic transfer film | | F1 | F1 | F1 | F1 | F1 | F1 |
| Metal plate | | X1 | X2 | X3 | X4 | X12 | X5 |
| Mn (× $10^4$) of polyester | | 1.0 | 1.1 | 9.0 | 2.9 | 1.4 | 1.0 |
| Deep drawability | | ○ | ○ | ○ | ○ | ○ | ○ |
| Xylene absorption | Sample shape A | 10 | 11 | 14 | 12 | — | 31 |
| amount (g/$m^2$) | Sample shape B | — | — | 13.7 | — | 3.9 | — |
| Hydraulic transferability | | ○ | ○ | ○ | ○ | ○ | ○ |
| Coating film adhesion | | 10 | 10 | 10 | 10 | 10 | 10 |
| Adhesion after hot water treatment | | ○ | ○ | ○ | ○ | ○ | ○ |

TABLE 2

| | | Example 7 | Example 8 | Example 9 | Comparative Example 1 | Comparative Example 2 |
|---|---|---|---|---|---|---|
| Hydraulic transfer film | | F1 | F1 | F1 | F1 | F1 |
| Metal plate | | X6 | X7 | X8 | with no coating film | X10 |
| Mn (× $10^4$) of polyester | | 1.0 | 1.0 | 1.0 | — | 1.3 |
| Deep drawability | | ○ | ○ | ○ | ○ | ○ |
| Xylene absorption | sample shape A | 38 | 32 | 34 | — | ND |
| amount (g/$m^2$) | sample shape B | — | — | — | — | 2.9 |
| Hydraulic transferability | | ○ | ○ | ○ | Δ | Δ |
| Coating film adhesion | | 10 | 10 | 10 | 0 | 2 |
| Adhesion after hot water treatment | | ○ | ○ | ○ | — | — |

ND: non-detection, i.e., impossible to determine

As is apparent from the results shown in Table 1 and Table 2, the use of a target body for transfer made of a metal substrate having a coating film layer wherein a xylene absorption amount is within a range from 3.5 to 100 g/$m^2$ improves the hydraulic transferability and also improves the coating film adhesion between a metal substrate and a transfer layer composed of a decorative layer.

TABLE 3

| | | Example 10 | Example 11 | Example 12 | Comparative Example 3 | Comparative Example 4 |
|---|---|---|---|---|---|---|
| Hydraulic transfer film | | F2 | F2 | F2 | F2 | F2 |
| Metal plate | | X1 | X3 | X4 | with no coating film | X9 |
| Mn (× $10^4$) of polyester | | 1.0 | 9.0 | 0.29 | — | 1.0 |
| Deep drawability | | ○ | ○ | ○ | ○ | ○ |
| Xylene absorption | Sample shape A | 10 | 14 | 12 | — | — |
| amount (g/$m^2$) | Sample shape B | — | 13.7 | — | — | 8.0 |
| Hydraulic transferability | | ○ | ○ | ○ | Δ | Δ |

TABLE 3-continued

| | Example 10 | Example 11 | Example 12 | Comparative Example 3 | Comparative Example 4 |
|---|---|---|---|---|---|
| Coating film adhesion | 10 | 10 | 10 | 2 | 0 |
| Scratch resistance | 2H | 2H | 2H | — | — |
| Surface gloss | 89 | 87 | 88 | — | — |
| Rubbing resistance | 91 | 90 | 92 | — | — |
| Detergent resistance | 83 | 84 | 86 | — | — |
| Adhesion after hot water treatment | ○ | ○ | ○ | — | — |

TABLE 4

| | | Example 13 | Example 14 | Example 15 |
|---|---|---|---|---|
| Hydraulic transfer film | | F2 | F2 | F2 |
| Metal plate | | X5 | X7 | X8 |
| Mn (× $10^4$) of polyester | | 1.0 | 1.0 | 1.0 |
| Deep drawability | | ○ | ○ | ○ |
| Xylene absorption | Sample shape A | 31 | 32 | 34 |
| amount (g/$m^2$) | Sample shape B | — | — | — |
| Hydraulic transferability | | ○ | ○ | ○ |
| Coating film adhesion | | 10 | 10 | 10 |
| Scratch resistance | | 2H | 2H | 2H |
| Surface gloss | | 87 | 88 | 88 |
| Rubbing resistance | | 91 | 92 | 92 |

TABLE 4-continued

| | Example 13 | Example 14 | Example 15 |
|---|---|---|---|
| Detergent resistance | 83 | 84 | 86 |
| Adhesion after hot water treatment | ○ | ○ | ○ |

As is apparent from the results shown in Table 3 and Table 4, the use of a target body for transfer made of a metal substrate having a coating film layer wherein a xylene absorption amount is within a range from 10 to 100 g/$m^2$ improves the hydraulic transferability and also improves the coating film adhesion between a metal substrate and a transfer layer composed of a protective layer, and improves scratch resistance, surface gloss, rubbing resistance and detergent resistance.

TABLE 5

| | | Example 16 | Comparative Example 5 | Comparative Example 6 | Example 17 | Example 18 |
|---|---|---|---|---|---|---|
| Hydraulic transfer film | | F3 | F3 | F3 | F3 | F3 |
| Metal plate | | X2 | with no coating film | X9 | X6 | X13 |
| Mn (× $10^4$) of polyester | | 1.1 | — | 1.0 | 1.0 | 1.0 |
| Deep drawability | | ○ | ○ | ○ | ○ | ○ |
| Xylene absorption | Sample shape A | 11 | — | — | 38 | 81 |
| amount (g/$m^2$) | Sample shape B | — | — | 8.0 | — | — |
| Hydraulic transferability | | ○ | x | Δ | ○ | ○ |
| Coating film adhesion | | 10 | 0 | 0 | 10 | 10 |
| Scratch resistance | | 2H | — | — | 2H | H |
| Surface gloss | | 88 | — | — | 88 | 85 |
| Rubbing resistance | | 92 | — | — | 92 | 91 |
| Detergent resistance | | 84 | — | — | 84 | 83 |
| Adhesion after hot water treatment | | ○ | — | — | ○ | ○ |

TABLE 6

| | | Example 19 | Example 20 | Comparative Example 7 | Comparative Example 8 | Example 21 |
|---|---|---|---|---|---|---|
| Hydraulic transfer film | | F4 | F4 | F4 | F4 | F4 |
| Metal plate | | X3 | X11 | with no coating film | X9 | X7 |
| Mn (× $10^4$) of polyester | | 9.0 | 1.6 | — | 1.0 | 1.0 |
| Deep drawability | | ○ | ○ | ○ | ○ | ○ |
| Xylene absorption | Sample shape A | 14 | 28 | — | — | 32 |
| amount (g/$m^2$) | Sample shape B | 13.7 | — | — | 8.0 | — |
| Hydraulic transferability | | ○ | ○ | x | Δ | ○ |
| Coating film adhesion | | 10 | 10 | 0 | 2 | 10 |
| Scratch resistance | | H | H | — | — | H |
| Surface gloss | | 87 | 86 | — | — | 86 |
| Rubbing resistance | | 90 | 90 | — | — | 90 |
| Detergent resistance | | 81 | 83 | — | — | 82 |
| Adhesion after hot water treatment | | ○ | ○ | — | — | ○ |

As is apparent from the results shown in Table 5 and Table 6, the use of a target body for transfer made of a metal substrate having a coating film layer wherein a xylene absorption amount is within a range from 10 to 100 $g/m^2$ improves the hydraulic transferability and also improves the coating film adhesion between a metal substrate and a transfer layer composed of a decorative layer and a protective layer, and improves scratch resistance, surface gloss, rubbing resistance and detergent resistance.

What is claimed is:

1. A hydraulic transfer method, which comprises hydraulically transferring a hydrophobic transfer layer onto a target body for transfer made of a metal substrate using a hydraulic transfer film comprising a substrate film made of a water-soluble or water-swellable resin and a hydrophobic transfer layer, which can be dissolved in an organic solvent, formed on the substrate film, the hydrophobic transfer layer having a protective layer made of a radiation-curable resin or a thermosetting resin, wherein the metal substrate is a metal substrate having a cured coating film layer in which a xylene absorption amount is within a range from 10 to 100 $g/m^2$.

2. The hydraulic transfer method according to claim 1, wherein the hydraulic transfer film has a transfer layer comprising the protective layer provided on the substrate film, and a decorative layer made of a printing ink coating film or a paint coating film provided on the protective layer.

3. The hydraulic transfer method according to claim 1 or 2, wherein the metal substrate having a cured coating film layer is a precoated metal plate.

4. The hydraulic transfer method according to claim 1 or 2, wherein the metal substrate having the cured coating film layer is formed into an arbitrary shape after forming the cured coating film layer.

5. The hydraulic transfer method according to claim 1 or 2, wherein the cured coating film layer is made of a cured article of a resin composition containing a polyester resin having a number-average molecular weight of 2,000 to 100,000 and at least one curing agent selected from the group consisting of isocyanate curing agent and amine curing agent.

6. The hydraulic transfer method according to claim 1 or 2, wherein the cured coating film layer is made of a cured resin obtained by reacting a polyester resin having at least one of a hydroxyl group and a carboxyl group at both terminals with diisocyanate.

7. The hydraulic transfer method according to claim 1 or 2, wherein the radiation-curable or thermosetting resin layer is made of a curable resin composition containing urethane acrylate having three or more (meth)acryl groups in a molecule and poly(meth)acrylate having a weight-average molecular weight of 30,000 to 300,000.

* * * * *